United States Patent [19]

Watkins et al.

[11] Patent Number: 4,475,595

[45] Date of Patent: Oct. 9, 1984

[54] METHOD OF INHIBITING SILICA DISSOLUTION DURING INJECTION OF STEAM INTO A RESERVOIR

[75] Inventors: David R. Watkins, Irvine; David J. Watanabe, Orange, both of Calif.

[73] Assignee: Union Oil Company of California, Los Angeles, Calif.

[21] Appl. No.: 410,316

[22] Filed: Aug. 23, 1982

[51] Int. Cl.$^3$ ............................................. E21B 43/24
[52] U.S. Cl. .................................................. 166/303
[58] Field of Search ................................ 166/272, 303

[56] References Cited

U.S. PATENT DOCUMENTS

| | | | |
|---|---|---|---|
| 3,258,070 | 6/1966 | Reusser | 166/266 |
| 3,410,345 | 11/1968 | Fradkin | 166/272 X |
| 3,454,095 | 7/1969 | Messinger et al. | 166/303 |
| 3,690,376 | 9/1972 | Zwicky et al. | 166/272 |
| 3,714,985 | 2/1973 | Bayless | 166/303 |
| 3,732,926 | 5/1973 | Brown et al. | 166/272 |
| 3,822,749 | 7/1974 | Thigpen, Jr. | 166/303 |
| 3,980,137 | 9/1976 | Gray | 166/272 X |
| 4,156,463 | 5/1979 | Hall | 166/272 |
| 4,191,252 | 3/1980 | Buckley et al. | 166/272 |
| 4,223,731 | 9/1980 | Estes et al. | 166/272 |
| 4,270,609 | 6/1981 | Choules | 166/272 X |
| 4,398,603 | 8/1983 | Rodwell | 166/267 |

OTHER PUBLICATIONS

Ali, "Wet Steam for Thermal Recovery", *Producers Monthly*, Feb. 1966, pp. 2 and 4-7.

Owens et al., "Performance of Equipment Used in High-Pressure Steam Floods", *Journal of Petroleum Technology*, Dec. 1966, pp. 1525-1531.

"Gravel Pack and Formation Sandstone Distillation During Steam Injection" by M. G. Reed, SPE Paper 8424, Sept. 23 to 26, 1979.

*Primary Examiner*—George A. Suchfield
*Attorney, Agent, or Firm*—Dean Sandford; Gregory F. Wirzbicki; Gerald L. Floyd

[57] ABSTRACT

A method for inhibiting the dissolution of silica from the matrix around a well during injection of steam into the matrix by adding to the feedwater used to generate the steam or the steam itself an inhibitor comprising an ammonium or substituted ammonium compound selected from the group consisting of ammonium halides, ammonium salts of inorganic acids, ammonium salts of carboxylic acids, quaternary ammonium halides, and amine or substituted amine hydrochlorides.

23 Claims, No Drawings

METHOD OF INHIBITING SILICA DISSOLUTION DURING INJECTION OF STEAM INTO A RESERVOIR

BACKGROUND OF THE INVENTION

1. Field of the Invention

This invention relates to a method for treating a subterranean reservoir penetrated by a well wherein, as part of the treatment, steam is injected into the reservoir. More particularly, the invention relates to such a method involving inhibiting the dissolution of silica from the permeable reservoir rock or from a gravel pack positioned in the well opposite the portion of the reservoir into which steam is injected.

2. Description of the Prior Art

Various treatments of permeable subterranean reservoirs penetrated by one or more wells involve injection of steam into the reservoir. Typical reservoirs include hydrocarbon-producing reservoirs and particularly those reservoirs containing heavy oil, bitumen, tar or similar viscous hydrocarbons. An example of one type of treatment involves the injection of steam into a portion of a reservoir to raise the temperature and consequently decrease the viscosity of the viscous hydrocarbons contained in the reservoir. Subsequently, these hydrocarbons can be more easily moved through the reservoir to a well through which they can be produced to the surface of the earth. Such treatments can be of the type referred to as a steam drive wherein steam is injected via one well and hydrocarbon are pushed through the reservoir and produced via another well. Alternatively, the treatments can be of the cylic steam injection type involving a single well wherein steam is injected for a first period of time following which the same well is produced for a second period of time.

A steam source provides steam for injection into the reservoir. The steam source is most often a fuel-fired steam generator capable of producing either essentially dry steam or wet steam such as steam containing various amounts of water up to more than 80 percent by weight water. Typically a mixture containing 50 to 80 percent by weight vapor is employed in the process of this invention. These mixtures are said to have a steam quality of 50 to 80 percent. Saturated steam having a quality of about 5 to 95 percent can also be used. Water from a water source such as a well, pond, stream, lake or similar source constitutes the generator feed water. The water can be transported directly from the source into the generator or may be treated first for removal of particulate matter or dissolved scale-forming components. Since many wells are located in remote, often arid areas, a convenient source of high purity water is frequently unavailable. The steam generator may be positioned downhole, but more often is positioned at the surface of the earth in the vicinity of the injection well.

The well via which the steam is injected into the reservoir may be completed in any of a number of ways. The bottom of the well is sometimes left open with a conduit extending to near the bottom of the well through which conduit fluids may be injected into or produced out of the reservoir. It has, however, been discovered when steam is injected through such a system that many oil-bearing reservoirs do not have sufficient physical strength to maintain their integrity during the production phase. Such reservoirs are frequently referred to as incompetent reservoirs. Finely divided particles becomes dislodged from an incompetent reservoir and move with the produced fluids into the well where the particles may settle and plug the tubing or other equipment in the well. If the incompetent reservoir is under a high pressure, the high velocity of the particles as they flow with the produced fluids may cause severe erosion of well equipment.

A technique commonly employed for controlling the flow of sand from an incompetent reservoir into a well involves the forming of a gravel pack in the well adjacent the portion of the incompetent reservoir through which fluids will pass into the well. The gravel pack is made up of coarse particles of sand, gravel, glass, cement clinker, ground nut shells, ceramic material or the like, which particles will normally range between about 2 ½ and 40 mesh on the U.S. Sieve Series Scale in size. Particles between about 4 and 20 mesh are normally preferred. It is generally advantageous to employ particles falling within a narrow size range. Hence, particles of about 4 to 6 mesh, 6 to 8 mesh, 8 to 12 mesh or 10 to 20 mesh will generally be used. The gravel pack is formed by injecting a fluid suspension of gravel or similar particles into the well to form a bed of solids containing small openings over which the reservoir sand will bridge. The flow of sands from the formation into the well during subsequent production operations is mitigated.

It is known that injection of steam into a reservoir can cause certain problems with respect to a gravel pack. SPE Paper No. 8424, Gravel Pack and Formation Sandstone Distillation During Steam Injection, by M. G. Reed, was presented at the 54th Annual Fall Technical Conference and Exhibition of the Society of Petroleum Engineers of AIME, held in Las Vegas, Nevada, Sept. 23 to 26, 1979. This paper describes a laboratory study of the problem that steam injected into a reservoir during oil recovery operations can dissolve large amounts of gravel pack sands and formation sandstones. In some cases downstream reprecipitation of reaction products can damage sandstone permeability. It is suggested that this dissolution can be decreased by lowering the pH of the hot alkaline steam generator effluent or by removal of bicarbonate ions from the effluent.

While some well treating methods have met with some success in particular applications, the need exists for a further improved steam injection treatment without substantial damage to the matrix around the well.

Therefore, it is a principal object of this invention to provide a method for enhanced oil recovery from a reservoir containing hydrocarbons, especially viscous hydrocarbons, by injecting steam into the reservoir.

It is a further object to provide such a method operable in treating wells penetrating permeable siliceous reservoirs or wells containing a gravel pack extending over the interval of the reservoir through which are passed fluids injected into or withdrawn from the reservoir.

It is a still further object to provide such a method wherein the dissolution by steam of silica from the reservoir or from the gravel pack is inhibited.

Other objects, advantages and features of this invention will become apparent to those skilled in the art from the following description and appended claims.

SUMMARY OF THE INVENTION

Briefly, the invention provides a method for inhibiting the dissolution of silica from silica-containing material in the vicinity of a well, especially a gravel pack and/or the reservoir rock, during a well treatment involving the injection of steam into the reservoir by adding to the boiler feedwater or to the steam itself, at some point prior to the time the steam contacts the silica-containing material, an effective amount of an inhibitor comprising an ammonium or substituted ammonium compound selected from the group consisting of ammonium halides, ammonium salts of inorganic acids, ammonium salts of carboxylic acids, quaternary ammonium halides, and amine or substituted amine hydrochlorides. Stated another way, the inhibitor comprises a compound containing a protonated ammonium or substituted ammonium ion capable of decomposing in the presence of steam to form a proton and an ammonium or a substituted ammonium cation, the proton remaining in the liquid phase and the ammonium or substituted ammonium cation in the vapor phase.

DETAILED DESCRIPTION OF THE INVENTION

In oil recovery operations, it is sometimes desired to inject wet steam, i.e., a mixture of a vapor phase and a liquid phase, into a permeable hydrocarbon-containing reservoir penetrated by a well. The steam aids in stripping hydrocarbons from the reservoir rock, as by lowering the viscosity of the hydrocarbons so that they flow more easily through the reservoir. However, it has been the experience that steam also tends to dissolve silica from silica-containing reservoirs adjacent the well and from gravel packs positioned in the well. This dissolution loosens small particles of the reservoir rock which particles can shift position and cause formation damage, e.g., at least partially plug the pores of the reservoir. If a gravel pack is attacked by steam, it can no longer perform its function of screening out loose formation fines and preventing them from being produced along with fluids subsequently produced from the reservoir through the gravel pack.

The source of steam used in the process of this invention is most frequently a steam generator. Boiler feedwater used in the generator often contains at least some bicarbonate ions. When steam is generated, the bicarbonate ion decomposes as follows:

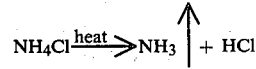

The carbon dioxide partitions into the gas phase while the hydroxyl ion remains in the liquid phase and increases its alkalinity. The solubility of siliceous minerals increases dramatically with pH. These minerals are quite soluble in the alkaline liquid phase of steam. In addition, it is believed that as steam containing dissolved silica is pushed farther out into a reservoir, the solution cools causing reprecipitation of the silica which partially plugs the reservoir pores and contributes to formation damage.

It has been found that the dissolution of silica by steam injected into a reservoir via a well completed in the reservoir can be inhibited by incorporating into the steam at some point prior to the time the steam contacts the reservoir rock, or a gravel pack if one is present in the well, an effective amount of an inhibitor comprising an ammonium or substituted ammonium compound selected from the group consisting of ammonium halides, ammonium salts of inorganic acids, ammonium salts of carboxylic acids, quaternary ammonium halides, and amine or substituted amine hydrochlorides. Stated another way, the inhibitor comprises a water-soluble compound containing a protonated ammonium or substituted ammonium ion capable of decomposing in the presence of steam to form an ammonium or a substituted ammonium cation which partitions into the vapor phase and a proton which remains in the liquid phase. This proton neutralizes the alkalinity produced by decomposition of the bicarbonate ions and, thus, prevents the sharp increase in pH of the liquid phase that causes silica dissolution. The inhibitor can be added directly to the feedwater used to generate the steam or to the steam itself. It is generally more convenient to prepare a concentrated solution of the inhibitor and add the concentrate to the feedwater or to the steam. Any liquid having mutual solubility for water and the inhibitor may be used to prepare the concentrate. For example, a solution of an inhibitor in an alcohol such as ethanol may be used. However, an aqueous solution is generally employed. When an inhibitor is added to the system, it decomposes when steam is generated as follows, using ammonium chloride as an example:

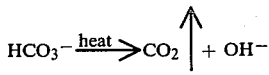

The ammonia partitions into the gas phase while hydrogen chloride remains in the liquid phase where it increases the acidity of the liquid.

The hydroxyl ion from the bicarbonate ion tends to be neutralized by the acid from the inhibitor. Thus, the amount of inhibitor required is approximately one equivalent weight of inhibitor for every equivalent weight of bicarbonate ion present in the feedwater. Significant inhibition of silica dissolution has been achieved by using about 0.10 to 2.5 equivalents of inhibitor per equivalent of bicarbonate. Stated another way, enough inhibitor is added to the system to adjust the pH of the water phase of the steam to below about 10.5, preferably 10.5 to 7 and most preferably 9.4 to 8.7. Frequently when the inhibitor is added to the feedwater or the steam itself, about 5 to 5,000 parts per million by weight (wppm) inhibitor, preferably 50 to 1,500 wppm, is employed.

The inhibitor is an ammonium or substituted ammonium compound selected from the group consisting of ammonium halides, ammonium salts of inorganic acids, ammonium salts of carboxylic acids, quaternary ammonium halides, and amine or substituted amine hydrochlorides.

Examples of suitable ammonium halides include ammonium chloride, ammonium bromide, ammonium fluoride, ammonium bifluoride and ammonium iodide. Particularly good resulsts have been obtained with ammonium chloride.

Examples of suitable ammonium salts of an inorganic acid include ammonium nitrate, ammonium nitrite, ammonium sulfate, ammonium sulfite, ammonium sulfamate, ammonium carbonate, ammonium borate, ammonium chromate and ammonium dichromate. Ammonium nitrate is preferred.

Examples of suitable ammonium salts of a carboxylic acid include ammonium acetate, ammonium citrate, ammonium tartrate, ammonium formate, ammonium gallate and ammonium benzoate.

The quaternary ammonium compounds for use in this invention can be represented by the general formula:

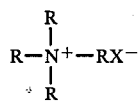

wherein at least one of the groups R is an organic hydrophobic group having 1 to 20 carbon atoms. The other substituents are independently alkyl or hydroxyalkyl groups having 1 to 4 carbon atoms, benzyl groups or alkoxy groups of the formula $(C_2H_4O)_nH$ or $(CH_3H_6O)_nH$ where n is 2 to 10. The preferred anion in the quaternary anion in the quaternary ammonium compounds is chloride. This can be replaced by various other anions such as bromide, iodide or ethylsulfate ions. Exemplary of suitable quaternary ammonium compounds are tetramethyl ammonium chloride, dioctyl dimethyl ammonium chloride, dodecyl trimethyl ammonium chloride, cetyl trimethyl ammonium chloride, cetyl trimethyl ammonium bromide, dodecyl trimethyl benzyl ammonium chloride, ethyltrimethyl ammonium iodide, iodomethyltrimethyl ammonium iodide, tetraethyl ammonium ennea-iodide, tetramethyl ammonium hepta-iodide and methyl pyridinum chloride.

Particularly good results have been obtained with tetramethyl ammonium chloride.

Also useful are amine or substituted amine hydrochlorides such as the mono-, di- and tri-alkyl amine hydrochlorides wherein the alkyl group contains 1 to 20 carbon atoms, straight chain or branched, aryl amine hydrochlorides, hydroxy-substituted amine hydrochlorides and heterocyclicsubstituted amine hydrochlorides. Examples of suitable materials include methylamine hydrochloride, ethylamine hydrochloride, propylamine hydrochloride, butylamine hydrochloride, dodecylamine hydrochloride, eicosylamine hydrochloride, diethylamine hydrochloride, triethylamine hydrochloride, benzylamine hydrochloride, napthylamine hydrochloride, hydroxylamine hydrochloride, 2-aminopyridine hydrochloride and 4aminopyridine hydrochloride. Particularly good results have been obtained with butylamine hydrochloride.

The invention is further illustrated by the following examples which are illustrative of various aspects of the invention and are not intended as limiting the scope of the invention as defined by the appended claims.

EXAMPLES 1 to 5

A series of laboratory tests are made to determine the effect of ammonium chloride on the dissolution of silica from a gravel pack by steam. A laboratory steam generator is designed and constructed to resemble a field steam generator on a small scale. Steam is passed first through a Jerguson gauge, i.e., a sight glass, to determine its quality. The flow is then switched through a gravel pack where the rate of silica dissolution is determined. Synthetic boiler feedwater A is prepared which is similar to the feedwater available at a first California well location A where steam injection operations are conducted. Feedwater A contains 147.7 ppm sodium sulfate, 2,107.2 ppm sodium chloride and 1,276.5 ppm sodium bicarbonate. A blank is run using no inhibitor additive. Various amounts of ammonium chloride are dissolved in a series of one liter portions of Feewater A to prepare a series of test solutions containing various concentrations of the inhibitor additive. One liter of a test solution is placed in a feed reservoir and the test solution pumped with a positive displacement feed pump via ⅛ inch diameter tubing to a heated section of tubing where the test solution is boiled to produce the desired quality of steam. Heat is provided by a hot oil bath. In a first phase of the test, the boiled mixture then passes to a Jerguson gauge, which separates the vapor and liquid phases of the steam mixture. The Jerguson gauge is maintained at 422° F., the saturation temperature corresponding to a system pressure of 300 psig, by heating tapes controlled by separate temperature controllers. The pressure is maintained by a back pressure valve. The vapor phase is passed through a condenser and collected in a vessel after passing through the back pressure valve. The liquid portion of the steam passes through a cooler and a metering valve to a collection vessel. After reaching a steady state, the steam quality is measured by the Jerguson gauge which determines the relative amounts of steam liquid and condensed steam vapor. The temperature of the steam generator is then adjusted to produce 80 percent quality steam. In a second phase of the test, the steam, rather than passing to the Jerguson gauge, passes through a gravel pack which consists of a 12-inch long, one inch diameter steel cylinder packed with 8 to 12 mesh silica sand. The effluent from the gravel pack is condensed, cooled and collected. 50 milliliter (ml) samples of the effluent are taken at intervals of about 1.5 hours over a span of about 5 hours. While taking these samples, the feed flow rate and the pH of the sample are measured. The sample is adjusted to a pH between 10 and 12 by the addition of a suitable amount of a 10 percent by weight aqueous solution of sodium hydroxide to prevent silica precipitation. The samples are then analyzed for silica content. From the silica concentration, the silica dissolution rate is computed. The results of these tests are given in Table 1 below. These tests show that the addition of ammonium chloride to the system sharply decreases the dissolution of silica from the gravel pack.

TABLE 1

Silica Dissolution by Steam Containing Various Amounts of Ammonium Chloride Inhibitor When Passed Through a Gravel Pack

| Example | Ammonium Chloride in Feedwater (ppm) | Ammonium Chloride in Feedwater (equivalents) | pH of Steam Liquid | Flow Time (hours) | pH of Gravel Pack Effluent | Flow Rate of Feedwater (ml/min) | Flow Rate of Steam Mixture (ml/min) | Superficial Velocity in Gravel Pack (cm/min) | Conc. of Silica in Effluent (ppm) | Rate of Dissolution (μg/min)* |
|---|---|---|---|---|---|---|---|---|---|---|
| 1 | none | 0 | 11.9 | 0.5 | 6.7 | 4.65 | 356 | 70.2 | 108 | 502 |
|   |   |   |   | 2.0 | 7.7 | 4.7 | 360 | 71.0 | 173 | 813 |
|   |   |   |   | 3.5 | 8.1 | 4.7 | 360 | 71.0 | 170 | 799 |
|   |   |   |   | 5.0 | 8.1 | 4.8 | 367 | 72.4 | 199 | 955 |
| 2 | 333 | 0.41 | 11.6 | 0.5 | 7.4 | 4.6 | 352 | 69.5 | 77 | 354 |
|   |   |   |   | 2.5 | 8.0 | 4.7 | 360 | 71.0 | 177 | 550 |

TABLE 1-continued

Silica Dissolution by Steam Containing Various Amounts of
Ammonium Chloride Inhibitor When Passed Through a Gravel Pack

| Example | Ammonium Chloride in Feedwater (ppm) | (equivalents) | pH of Steam Liquid | Flow Time (hours) | pH of Gravel Pack Effluent | Flow Rate of Feedwater (ml/min) | Flow Rate of Steam Mixture (ml/min) | Superficial Velocity in Gravel Pack (cm/min) | Conc. of Silica in Effluent (ppm) | Rate of Dissolution (μg/min)* |
|---|---|---|---|---|---|---|---|---|---|---|
| | | | | 4.5 | 8.0 | 4.7 | 360 | 71.0 | 123 | 578 |
| 3 | 667 | 0.83 | 10.5 | 0.5 | 7.6 | 4.9 | 375 | 74.0 | 48 | 235 |
| | | | | 1.75 | 7.7 | 4.75 | 363 | 71.6 | 55 | 261 |
| | | | | 3.0 | 7.8 | 4.75 | 363 | 71.6 | 61 | 290 |
| | | | | 4.25 | 7.85 | 4.75 | 363 | 71.6 | 67 | |
| 4 | 1,000 | 1.24 | 8.7 | 0.5 | 7.8 | 4.4 | 337 | 66.4 | 9.5 | 41.8 |
| | | | | 2.25 | 7.8 | 4.5 | 344 | 67.9 | 11.4 | 51.3 |
| | | | | 4.25 | 7.9 | 4.55 | 348 | 68.7 | 8.9 | 40.5 |
| 5 | 1,334 | 1.65 | 8.5 | 0.5 | 7.5 | 4.75 | 363 | 71.7 | 17 | 80.7 |
| | | | | 2.0 | 7.7 | 4.65 | 356 | 70.2 | 14 | 65.1 |
| | | | | 3.5 | 7.9 | 4.75 | 363 | 71.7 | 11 | 52.3 |

*Micrograms per minute.

EXAMPLES 6 to 11

A second series of tests are made to determine the effect of various other additives on the dissolution of silica from a gravel pack. The test apparatus and procedure used are the same as described above in Examples 1 to 5 except for two minor changes. The feedwater used is a synthetic boilder feedwater similar to that available at a second California well location B. The feedwater contains 671 ppm sodium chloride and 416 ppm sodium bicarbonate. Also in these tests the steam generator is heated by a heating coil. The results of these tests are given in Table 2. These tests show that each of the inhibitors tested was effective in reducing silica dissolution from the gravel pack.

TABLE 2

Silica Dissolution by Steam Containing Various Dissolution Inhibitors When Passed Through a Gravel Pack

| Example | Conc. of Inhibitor in Feedwater (ppm) | (equivalents) | | Flow Time (hours) | Steam Quality (percent by wt.) | Rate of Dissolution (μg/min)* |
|---|---|---|---|---|---|---|
| 6 | none | 0 | | 1 | 65 | 344.0 |
| | | | | 2 | | 424.8 |
| | | | | 3 | | 438.6 |
| | | | | 4 | | 477.0 |
| | | | | 5 | | 441.0 |
| 7 | 300 | 1.13 | ammonium chloride | 1 | 65 | 50.0 |
| | | | | 2 | 65 | 50.0 |
| | | | | 3 | | 50.0 |
| 8 | 370.5 | 1.31 | ammonium sulfate | 1 | 62 | 81.6 |
| | | | | 2 | | 59.2 |
| | | | | 3 | | 70.0 |
| 9 | 615 | 1.13 | butylamine hydrochloride | 1 | 65 | 115.0 |
| | | | | 2 | | 107.1 |
| | | | | 2.75 | | 90.0 |
| 10 | 614 | 1.13 | tetramethyl ammonium chloride | 1 | 63.4 | 122.5 |
| | | | | 2 | | 74.4 |
| | | | | 3 | | 65.8 |
| 11 | 500 | 1.24 | ammonium nitrate | 1 | 60 | 42.3 |
| | | | | 1.5 | | 28.3 |
| | | | | 3 | | 24.3 |

EXAMPLE 12

Heavy oil in a California field is recovered by injecting 60 percent quality steam at a temperature of 500° F. into the reservoir to reduce the oil's viscosity. Viscosity reduction facilitates flow of the oil through the reservoir to the production wells. Steam is injected into the reservoir in a cyclic steam injection treatment wherein steam is injected down a production well for a short period of time to heat up the matrix surrounding the well, and then the well is returned to production. The liquid phase effluent from the steam generator has a pH above 9.5 Under these conditions significant damage to the well is likely due to dissolution of silica from the gravel pack of the portion of the reservoir contacted by the steam. In this field cyclic steam wells have filled with sand upon production of oil after steam injection. Well failure is attributed to dissolution of siliceous minerals near the well. This results in failure of gravel packs, unconsolidation of reservoir rock and permeability loss due to liberation and migration of fines.

In order to prevent these failures, ammonium chloride is injected into the generator feedwater to reduce the pH of the liquid effluent from 11.3 to about 9.0. A pH of 9.0 is obtained by adding a liquid concentrate of a 20 percent by weight aqueous solution of ammonium chloride to the feedwater. The concentrate is injected with a proportioning pump to maintain a constant concentration of ammonium chloride in the feedwater of about 180 ppm. The pump varies injection rate as the rate as the rate of feedwater to the generator varies. This concentration of ammonium chloride is sufficient to compensate for the alkalinity produced by decomposition of the bicarbonate ions which are present in the feedwater at a concentration of 220 ppm. The generator throughput is about 1,400 barrels per day, so about 45 gallons per day of the aqueous solution of ammonium chloride are needed to treat the feedwater. After treating a well in this manner for about 14 days, injection of steam is stopped and the well is placed in production. No formation fines are produced along with the produced fluids. This indicates that silica dissolution during steam injection is inhibited.

While various specific embodiments and modifications of this invention have been described in the foregoing specification, further modifications will be apparent to those skilled in the art. Such further modifications are included within the scope of this invention as defined by the following claims:

We claim:
1. A method for inhibiting the dissolution of silica from a silica-containing material in the vicinity of a well penetrating a hydrocarbon-containing reservoir during the injection of steam into the reservoir via the well comprising adding to the boiler feedwater used to generate the steam or to the steam itself an ammonium or substituted ammonium compound selected from the group consisting of ammonium halides, ammonium salts of inorganic acids, ammonium salts of carboxylic acids, quaternary ammonium halides and amine or substituted amine hydrochlorides.
2. The method defined in claim 1 wherein the silica-containing material is the reservoir rock.
3. The method defined in claim 1 wherein the silica containing material is a gravel pack.
4. The method defined in claim 1 wherein the steam is a saturated steam of about 5 to 95 percent quality
5. The method defined in claim 4 wherein the amount of the ammonium or substituted ammonia compound used is sufficient to lower the pH of the liquid phase of the steam to below about 10.5.
6. The method defined in claim 4 wherein the amount of the ammonium or substituted ammonium compound used is sufficient to lower the pH of the liquid phase of the steam to 10.5 to 7.
7. The method defined in claim 4 wherein the amount of the ammonium compound used is sufficient to lower the pH of the liquid phase of the steam to 9.4 to 8.7.
8. The method defined in claim 1 wherein the ammonium compound is added as a concentrated solution.
9. The method defined in claim 8 wherein the concentrated solution is a concentrated aqueous solution.
10. The method defined in claim 1 wherein the boiler feedwater contains bicarbonate ions.
11. The method defined in claim 10 wherein about 0.10 to 2.5 equivalent weights of the ammonium or substituted ammonium compound is employed per equivalent weight of bicarbonate ion present in the boiler feedwater.
12. The method defined in claim 10 wherein about 1 equivalent weight of the ammonium or substituted ammonium compound is employed per equivalent weight of bicarbonate ion present in the boiler feedwater.
13. The method defined in claim 1 wherein the ammonium or substituted ammonium compound is added at a concentration of about 5 to 5,000 parts per million by weight.
14. The method defined in claim 1 wherein the ammonium or substituted ammonium compound is added at a concentration of about 50 to 1,500 parts per million by weight.
15. The method defined in claim 1 wherein the amine or substituted amine hydrochloride is selected from the group consisting of a mono-, di- or tri-alkyl amine hydrochloride wherein the alkyl group contains 1 to 20 carbon atoms, an aryl amine hydrochloride, a hydroxy-substituted amine hydrochloride, and a hetrocyclic-substituted amine hydrochloride.
16. The method of claim 15 wherein the amine hydrochloride is butylamine hydrochloride.
17. The method defined in claim 1 wherein the compound is ammonium chloride.
18. The method defined in claim 1 wherein the compound is ammonium nitrate.
19. The method defined in claim 1 wherein the compound is tetramethyl ammonium chloride.
20. The method defined in claim 1 wherein the ammonium or substituted ammonium compound is added to the boiler feedwater or to the steam itself at some point prior to the time that the steam contacts the silica-containing material.
21. The method defined in claim 1 wherein the ammonium or substituted ammonium compound is a water-soluble compound containing a protonated ammonium or substituted ammonium ion capable of decomposing in the presense of steam to form an ammonium or a substituted ammonium cation which partitions into the vapor phase and a proton which remains in the liquid phase.
22. A method for inhibiting the dissolution of silica from the reservoir in the vicinity of a well penetrating the reservoir or from a gravel pack positioned in the well during the injection of wet steam into the reservoir via the well comprising adding to a bicarbonate-ion-containing boiler feedwater used to generate the steam or to the steam itself which contains the decomposition products of bicarbonate ions, before the steam contacts the reservoir or the gravel pack an effective amount of an ammonium or substituted ammonium compound selected from the group consisting of ammonium chloride, ammonium nitrate butylamine hydrochloride and tetramethyl ammonium chloride.
23. The method defined in claim 22 wherein about 0.10 to 2.5 equivalent weights of the ammonium or substituted ammonium compound is employed per equivalent weight of bicarbonate ion present in the boiler feedwater.

* * * * *